United States Patent
Traut et al.

(10) Patent No.: US 7,657,888 B2
(45) Date of Patent: *Feb. 2, 2010

(54) METHOD FOR FORKING OR MIGRATING A VIRTUAL MACHINE

(75) Inventors: Eric P. Traut, Bellevue, WA (US); Rene A. Vega, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

This patent is subject to a terminal disclaimer.

(21) Appl. No.: 11/963,067

(22) Filed: Dec. 21, 2007

(65) Prior Publication Data

US 2008/0098154 A1 Apr. 24, 2008

Related U.S. Application Data

(63) Continuation of application No. 10/193,531, filed on Jul. 11, 2002, now Pat. No. 7,313,793.

(51) Int. Cl.
*G06F 9/455* (2006.01)
*G06F 21/00* (2006.01)
*G06F 13/00* (2006.01)
*G06F 15/16* (2006.01)

(52) U.S. Cl. .................... 718/1; 711/6; 711/145; 709/201

(58) Field of Classification Search ............. 718/1; 711/6, 145; 709/201
See application file for complete search history.

(56) References Cited

U.S. PATENT DOCUMENTS

| | | | |
|---|---|---|---|
| 5,313,647 A | 5/1994 | Kaufman et al. | 718/102 |
| 5,752,036 A | 5/1998 | Nakamura | |
| 6,704,764 B1 | 3/2004 | Ottati | 718/100 |
| 6,732,220 B2 | 5/2004 | Babaian et al. | 711/6 |
| 6,795,966 B1 | 9/2004 | Lim | |
| 6,802,062 B1 | 10/2004 | Oyamada et al. | 718/1 |
| 6,850,953 B1 | 2/2005 | Deshpande et al. | 707/103 |
| 7,065,549 B2 | 6/2006 | Sun | |
| 7,093,086 B1 | 8/2006 | Van Rietschote | 711/161 |
| 7,139,406 B2 | 11/2006 | McClelland | |
| 7,257,811 B2 | 8/2007 | Hunt | |
| 7,299,468 B2 | 11/2007 | Casey | |
| 7,313,793 B2 | 12/2007 | Traut | |
| 7,506,265 B1 | 3/2009 | Traut | |
| 2002/0029308 A1 | 3/2002 | Babaian et al. | 710/240 |
| 2002/0184287 A1 | 12/2002 | Nunally | |

(Continued)

OTHER PUBLICATIONS

Casas, J. et al., "MPVM: A Migration transparent Version of PVM", *Department of Computer Science and Engineering*, Oregon Graduate Institute of Science & Technology, 1995, 27 pages.

(Continued)

*Primary Examiner*—Meng-Ai An
*Assistant Examiner*—Jennifer N To
(74) *Attorney, Agent, or Firm*—Woodcock Washburn LLP

(57) ABSTRACT

A method is provided for increasing the efficiency of virtual machine processing. A parent virtual machine is provided on a host computer. The parent virtual machine is temporarily or permanently suspended. A child virtual machine is created at a new location by forking the parent virtual machine. The child virtual machine may not initially include all the stored data that is associated with the parent virtual machine.

15 Claims, 5 Drawing Sheets

U.S. PATENT DOCUMENTS

2003/0033344 A1  2/2003  Abbott et al. .................. 709/1
2003/0182358 A1  9/2003  Rowley
2006/0085784 A1  4/2006  Traut

OTHER PUBLICATIONS

Kozuch, M. et al., "Efficient State Transfer for Internet Suspend/Resume", 2002, Intel Corporation, 12 pages.

Kozuch, M. et al., "Internet Suspend/Resume", *Fourth IEEE Workshop on Mobile Computing Systems and Applications*, 2002, 8 pages.

Sapuntzakis, C. et al., "Optimizing the Migration of Virtual Computers", *Proceedings of the 5th Symposium on Operating Systems Design and Implementation*, 2002, 16 pages.

Ueda et al., "Concepts of Movable Server," Technical Report of Informatio Processing Society of Japan, Feb. 3, 2000, 2000(14), p. 41-47.

Casas et al., "Adaptive Load Migration Systems for PVM," Supercomputing' 94 Proceedings, IEEE, Nov. 18, 1994, p. 390-399.

Karger et al., "A VMM security kernel for the VAX architecture," Proceedings of the Symposium on Research in Security and Privacy, Oakland, May 7-9, 1990, IEEE Comp. Soc. Press, 11, p. 2-19, XP010020182.

Chen et al., "When virtual is better than real," Hot Topics in Operating Systems, 2001, Proceedings of the Eight Workshop on May 20-22, 2001, IEEE, p. 133-138, XP010583095.

U.S. Appl. No. 10/109,406, filed Mar. 28, 2002, now abandoned, inventorship unknown, 37 pages.

METHOD FOR FORKING OR MIGRATING A VIRTUAL MACHINE

CROSS-REFERENCE

This application is a continuation of U.S. patent application Ser. No. 10/193,531, filed on Jul. 11, 2002 entitled "METHOD FOR FORKING OR MIGRATING A VIRTUAL MACHINE", which is now U.S. Pat. No. 7,313,793, the contents of which are herein incorporated by reference.

FIELD OF THE INVENTION

The present invention relates in general to the field of virtual machines and, more particularly, to a method for applying the concepts of forking and migration to virtual machines.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will want to maximize its functionality by having more rather than fewer applications run on the microprocessor family associated with the computer manufacturer's product line. To expand the number of operating systems and application programs that can run on a computer system, a field of technology has developed in which a given computer having one type of CPU, called a host, will run an emulator program that allows the host computer to emulate receiving and executing the instructions of an unrelated type of CPU, called a guest. Thus, the host computer will execute an application that will cause one or more host instructions to be called in response to a given guest instruction. In some cases, the host computer can both run software designed for its own hardware architecture, other than the emulation program, and software written for computers having an unrelated hardware architecture. As a more specific example, a computer system manufactured by Apple Computer, for example, may run operating systems and programs written for PC-based computer systems. It may also be possible to use an emulator program to concurrently operate multiple incompatible operating systems on a single CPU. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the guest computer system exists only as a software representation of the operation of the hardware architecture of the guest computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

One advantage of a virtual machine over a real machine is the ability to quickly and cheaply create multiple instances of virtual machines. If allowed by the virtual machine implementation, multiple virtual machines can exist simultaneously in a single host machine (host computer system) environment. Resources of the host machine can be divided among the various virtual machines. For example, a single host machine with four processors and 1 gigabyte of random access memory (RAM) could be divided evenly into four virtual machines, each of which is given one processor and 256 megabytes of RAM. Other resource allocation divisions are possible.

This flexible resource allocation becomes even more useful when combined with the ability to move virtual machines from one host machine to another. This allows for "load balancing" of systems. For example, if a virtual machine requires more processing power than is available on one host machine, it can be moved to another host machine that has extra capacity.

In some computing environments, it is useful to have multiple machines that are nearly identical in configuration (both hardware and software). For example, a large electronic-commerce web site such as Amazon.com has dozens or hundreds of web servers that are all nearly identical in configuration. This setup allows for easy expandability. When current capacity is inadequate, additional servers can quickly be brought on line.

Another case where nearly-identical configurations are useful is in the testing of configuration modifications. When dealing with mission-critical applications, IS managers often want to test software configuration changes before applying them to the production system. For example, if a new "security patch" was made available by Microsoft Corporation for the Windows operating system, an administrator may want to test this patch on a separate server machine before installing the patch on the production server.

SUMMARY OF THE INVENTION

The present invention in one implementation provides a method for increasing the efficiency of virtual machine processing. One step of the method is providing a parent virtual machine. Another step is temporarily suspending the parent virtual machine. Another step is forking the parent virtual machine to create a child virtual machine at a new location.

The present invention provides another method for increasing the efficiency of virtual machine processing. One step of the method is providing a parent virtual machine that is associated with stored data. Another step of the method is temporarily suspending the parent virtual machine. Another step is forking the parent virtual machine to create a child virtual machine at a new location without at least a first portion of the stored data.

Further, the present invention provides another method for increasing the efficiency of virtual machine processing. One step of the method is providing a parent virtual machine that is associated with stored data. Another step of the method is permanently suspending the parent virtual machine. Another step is migrating the parent virtual machine to create a child virtual machine at a new location without at least a first portion of the stored data.

An advantage of one implementation of the present invention is that it makes possible the forking of a virtual machine. The ability to fork increases the utility of the aforementioned multiple instances of virtual machines. Forking can, in some circumstances, create multiple instances quickly enough that most functions of and applications running on the virtual machines are not affected significantly.

Another advantage of an implementation of the present invention is that it increases the efficiency of virtual machine processing.

One implementation of the method of the present invention has the advantage of a forking time unaffected by the size of the parent virtual machine's memory. When the non-memory portion of the parent virtual machine consists of only a few hundred kilobytes of data, the forking time is about a millisecond on some systems.

If demand paging is added to the method, then total execution time may also depend on the size of the parent's memory. However, demand paging does not cause conflicts with the applications running on the parent and child virtual machines.

No one of the preceding advantages is critical to the invention. Particular implementations of the invention may achieve only a subset of the advantages. For example, one implementation of the invention may only provide the option of forking a virtual machine. Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF ILLUSTRATIVE EMBODIMENTS

Figure 1:
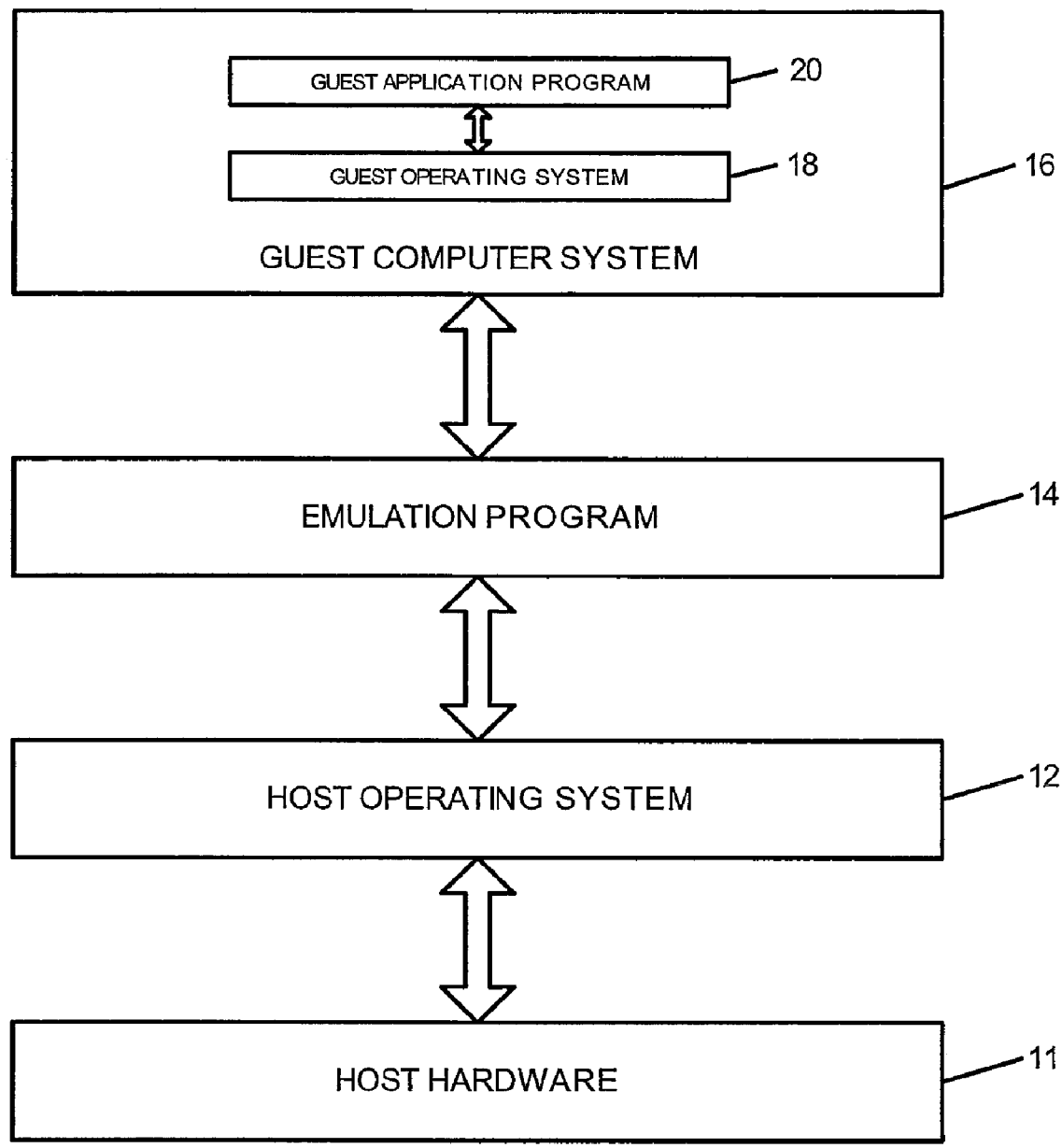
FIG. 1 is a diagram of the logical relationship of the elements of an emulated computer system running in a host computer system.

In the case of an emulated computer system or virtual machine, an emulation program provides an emulated operating environment in the host computer system. Shown in FIG. 1 is a diagram of the logical layers of the hardware and software architecture for an emulated operating environment in a computer system 10. An emulation program 14 runs on a host operating system that executes on the host computer system hardware or processor 11. Emulation program 14 emulates a guest computer system 16, including a guest operating system 18. Guest application programs are able to execute on guest operating system 18. In the emulated operating environment of FIG. 1, because of the operation of emulation program 14, guest application 20 can run on the computer system 10 even though guest application 20 is designed to run on an operating system that is generally incompatible with host operating system 12 and host computer system hardware 11.

Figure 2:
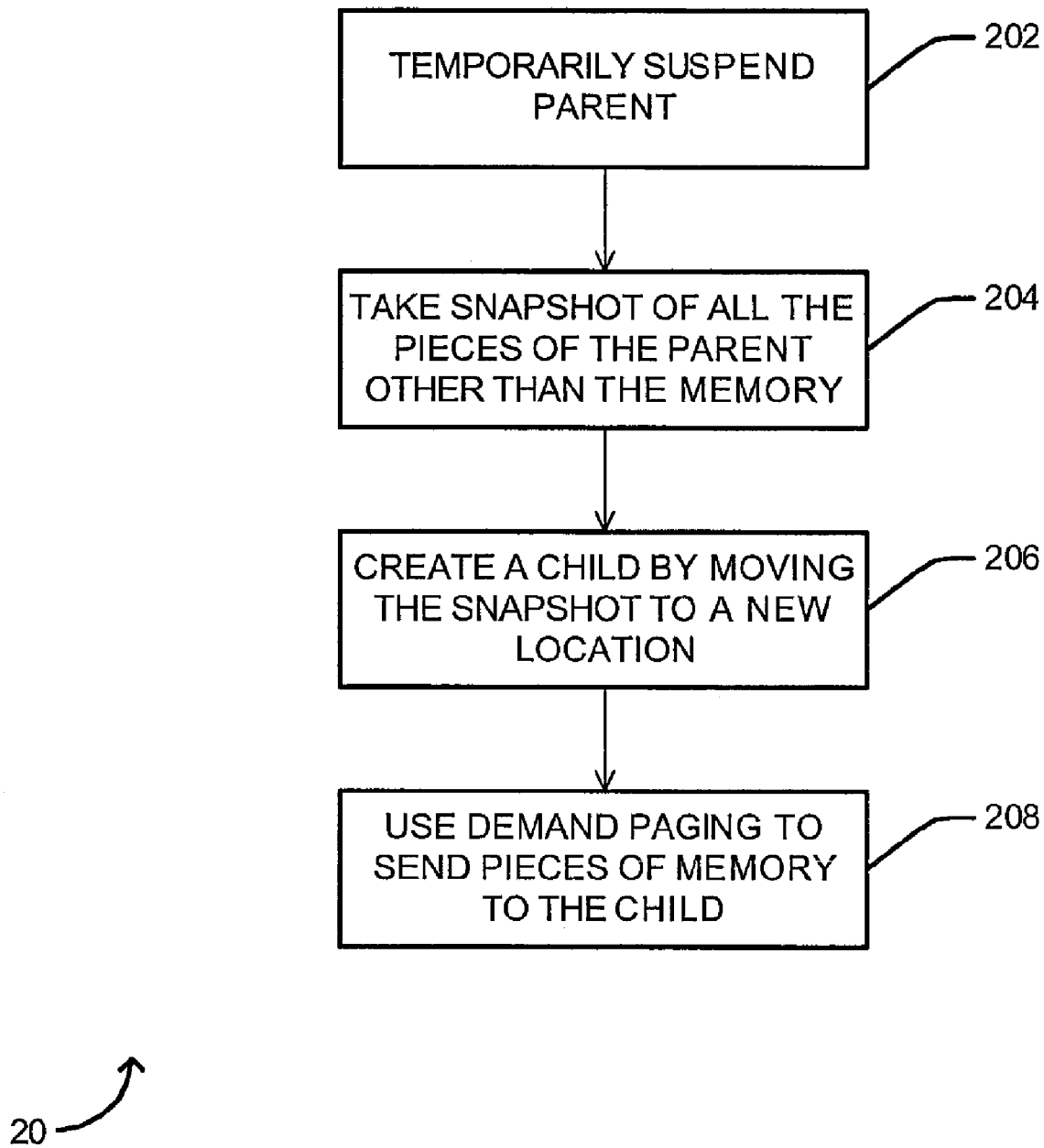
FIG. 2 is a flow diagram of a method for forking a virtual machine.
Figure 3:
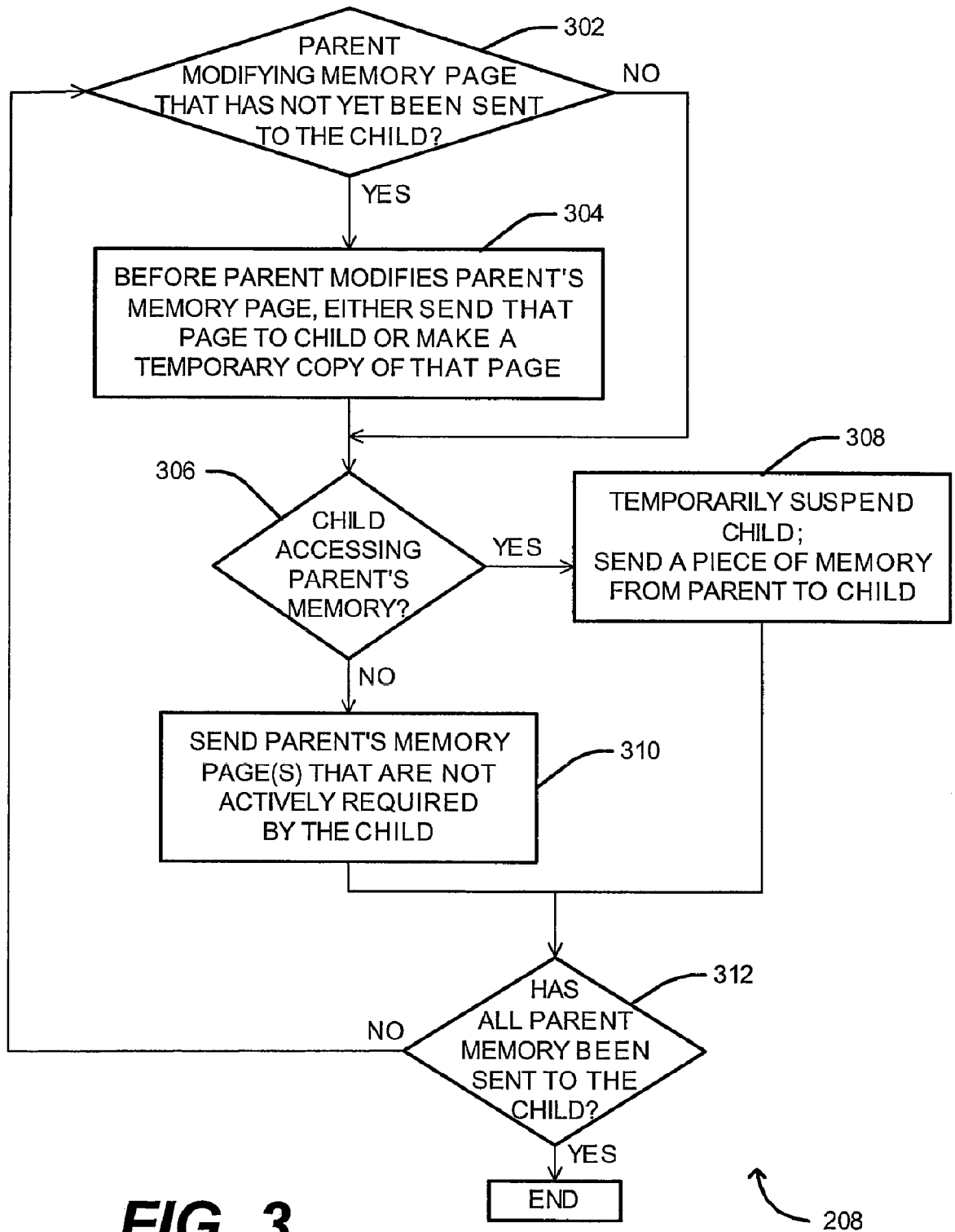
FIG. 3 is a flow diagram of demand paging used in forking a virtual machine.

Referring now to FIGS. 2 and 3, "forking" is a term used by UNIX programmers to describe the duplication of a UNIX process and its address space. Both the original process and the fork are then allowed to run as independent processes from the forking point. The implementation of forking often involves a technique called "copy on write" in which case all memory pages in both address spaces are marked "write protected". When either the original or the forked process writes to a page, a copy is made so that each process has its own copy. Pages that are not modified can continue to be shared between the two processes. This technique not only saves on memory resources, but it also makes forking much faster than otherwise possible.

In the present invention, the concept of forking a single process is combined with the concept of a virtual machine. The present invention allows for fast conversion of shared resources to private copies between an original virtual machine and its fork. However, resource sharing is possible only if both virtual machines are running on the same host.

Virtual machine forking can be used to quickly replicate an existing virtual machine. For example, if a user wants to test a new patch, he can fork the virtual machine and apply the patch to the non-production fork. Once the patch has been tested, it can be applied to the original copy with limited risk.

Alternatively, the production and non-production virtual machines could be swapped once the testing of the patch was completed.

Shown in FIG. 2 is a flow diagram of a method 20 for forking a virtual machine. In step 202, a virtual machine parent is suspended. In step 204, a copy or "snapshot" is made of all of the pieces of the parent virtual machine other than the memory of the parent virtual machine. In step 206, the snapshot is moved to a new location, i.e. a location other than the location of the parent. Moving the snapshot to a new location creates a new virtual machine child. The child may or may not be located on the same host computer system as the parent. In step 208, pieces of the parent's memory are sent to the child using demand paging. Demand paging, depicted in FIG. 3, is a method for sending pieces or pages of memory from the parent to the child. In demand paging, parent memory is prioritized based on what the child actively requires.

FIG. 3 is a flow diagram of the demand paging of step 208 used in forking a virtual machine. In step 302, it is determined whether or not the parent virtual machine is about to modify a piece of the parent's memory that has not yet been sent to the child. If the parent virtual machine is about to modify a memory piece, in step 304, then before the parent is allowed to modify the memory piece, either the piece is sent to the child virtual machine or a temporary copy of the piece is made. The temporary copy is saved by the parent until a later, as-yet-undetermined point in the demand paging method, at which point the copy is sent to the child. If the parent is not about to modify a memory piece or if step 304 is completed, the method proceeds to step 306.

In step 306, it is determined whether or not the child virtual machine is accessing the memory of the parent virtual machine. If the child is accessing the parent's memory, in step 308, the child virtual machine is temporarily suspended and the piece of the parent's memory required by the child is sent from the parent to the child. If the child is not accessing the parent's memory, in step 310, pieces of the parent's memory that are not actively required by the child may be sent from the parent to the child. If step 308 or step 310 is completed, the method proceeds to step 312.

In step 312, it is determined whether or not all of the memory of the parent virtual machine has been sent to the child virtual machine. If not all of the memory has been sent, the method proceeds to step 302, described above. If all of the memory has been sent, then the demand paging method ends.

Figure 4:
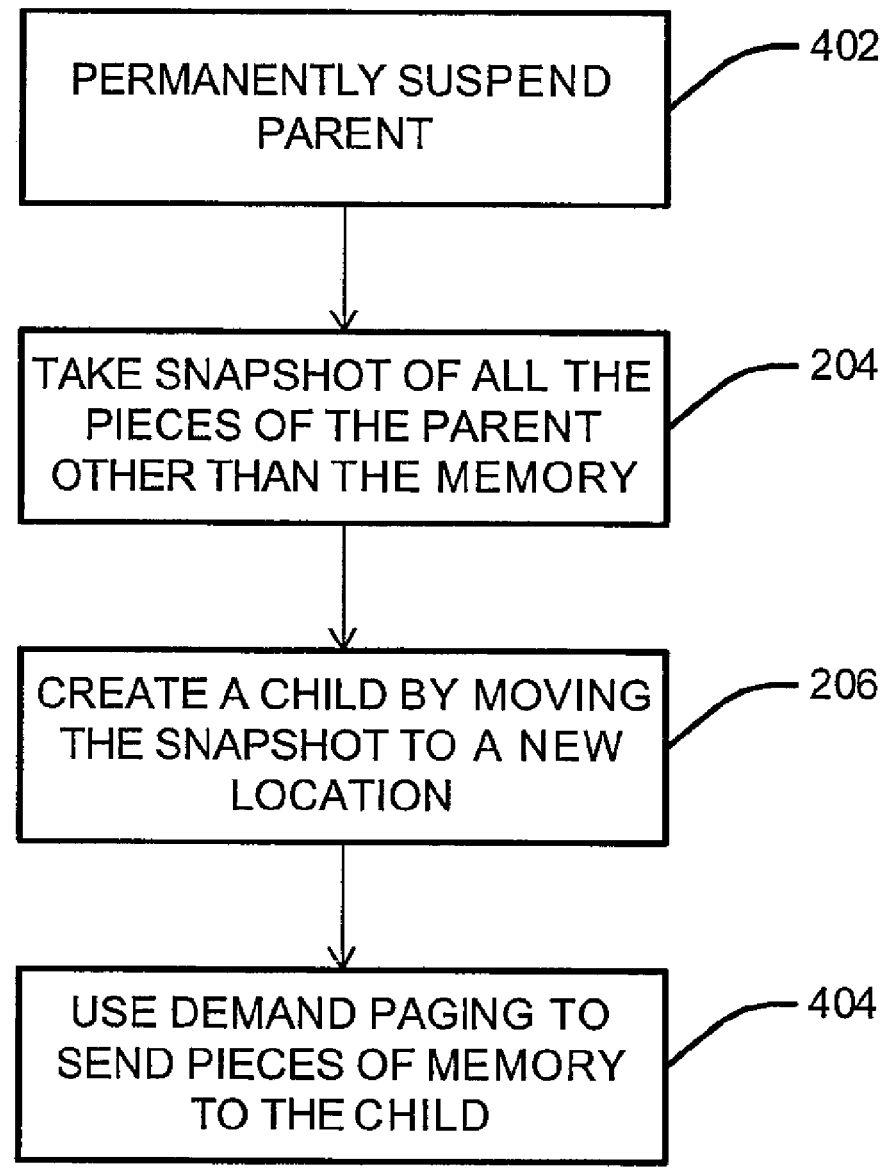
FIG. 4 is a flow diagram of a method for migrating a virtual machine.
Figure 5:
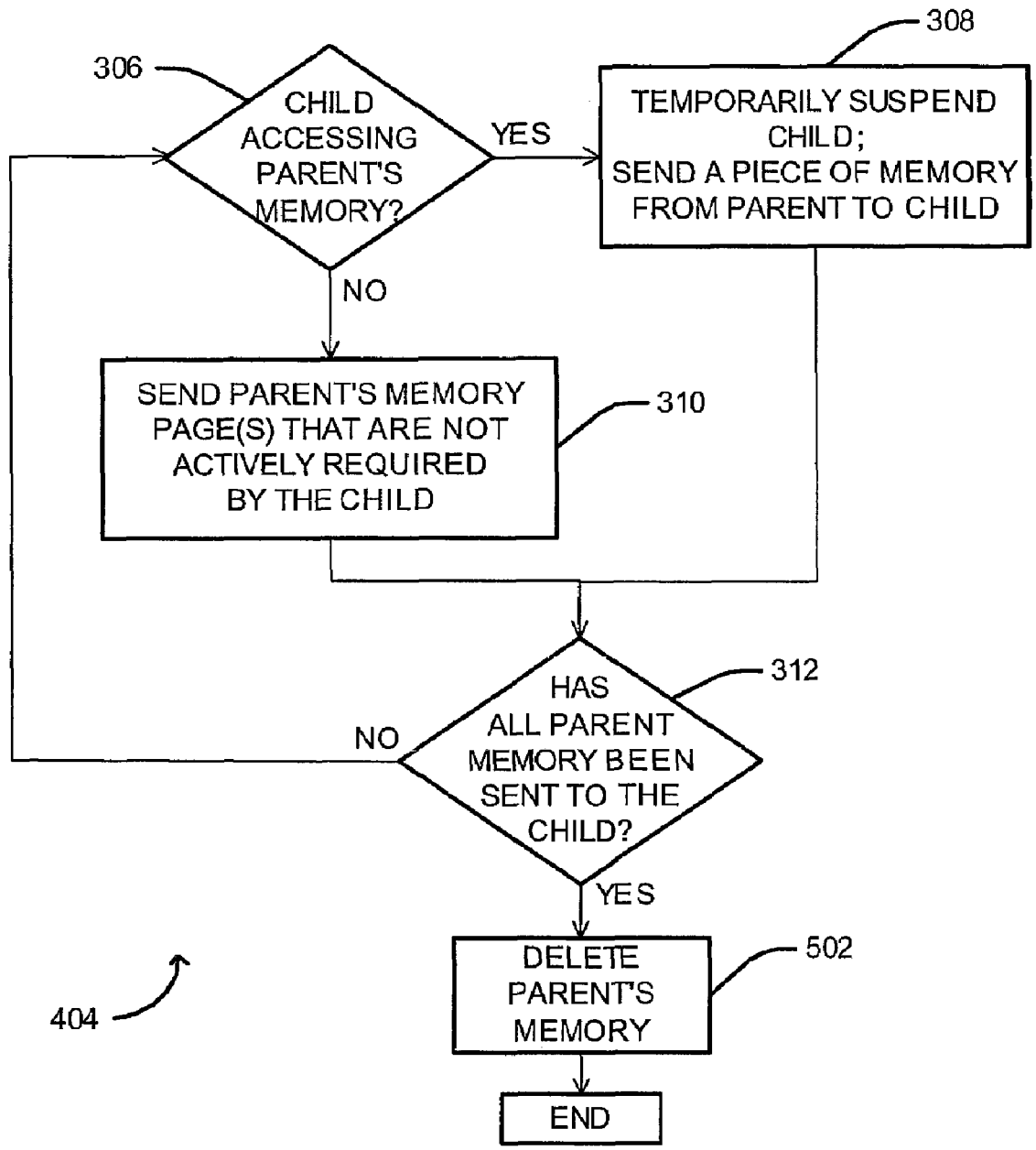
FIG. 5 is a flow diagram of demand paging used in migrating a virtual machine.

Referring now to FIGS. 4 and 5, "migrating" is a term that refers to the movement of a virtual machine from one host machine to another. When a virtual machine is migrated, the original virtual machine is permanently suspended; and the copy runs in a new location. One way to implement migration involves saving the entire state of the virtual machine (including all of its RAM) to a file on disk, then copying the file to the new host and restoring the machine state.

In the present invention, migrating is similar to forking in its implementation. As with a forked virtual machine, a migrated virtual machine can start running almost immediately after it is created, i.e. within a second or two after creation. This feature results from the use of demand paging and "copy-on-access," wherein copy-on-access is defined as the copying of parent's memory to the child upon the child's accessing the parent's memory. Copy-on-access is an aspect of demand paging for migrating a virtual machine.

Copy-on-access is also an advantage of the present invention over existing technologies. Existing technologies save and restore an entire copy of the parent's Random Access Memory (RAM). Existing technologies' saving and restoring can take anywhere from 5 to 60 seconds, depending on the size of the memory allocated to the parent One application of migrating a virtual machine is load balancing. Another application would be for fail-over or hardware maintenance. For example, if the hardware in the host machine requires maintenance (e.g. more memory is to be added), the virtual machine can be temporarily migrated to a backup machine, preventing downtime.

Shown in FIG. 4 is a flow diagram of a method 40 for migrating a virtual machine. In step 402, a parent virtual machine is permanently suspended. In step 204, a copy or "snapshot" is made of all of the pieces of the parent virtual machine other than the memory of the parent virtual machine. In step 206, the snapshot is moved to a new location, i.e. a location other than the location of the parent. Moving the snapshot to a new location creates a child virtual machine. The child may or may not be located on the same computer system as the parent. In step 404, pieces of the parent's memory are sent to the child using demand paging. Demand paging, depicted in FIG. 5, is a method for sending pieces or pages of memory from the parent to the child. In demand paging, parent memory is prioritized based on what the child actively requires.

FIG. 5 is a flow diagram of the demand paging of step 404 used in migrating a virtual machine. In step 306, it is determined whether or not the child virtual machine is accessing the memory of the parent virtual machine. If the child is accessing the parent's memory, in step 308, the child virtual machine is temporarily suspended and the piece of the parent's memory required by the child is sent from the parent to the child. If the child is not accessing the parent's memory, in step 310, pieces of the parent's memory that are not actively required by the child may be sent from the parent to the child. If step 308 or step 310 is completed, the method proceeds to step 312.

In step 312, it is determined whether or not all of the memory of the parent virtual machine has been sent to the child virtual machine. If not all of the memory has been sent, the method proceeds to step 306, described above. If all of the memory has been sent, the method proceeds to step 502. In step 502, the parent's memory is deleted. After step 502, the demand paging method ends.

The present invention is not limited in its application to the emulation of a particular computer system architecture, particularly the Intel 80X86 architecture.

Although the present invention has been described in detail, it should be understood that various changes, substitutions, and alterations can be made thereto without departing from the spirit and scope of the invention as defined by the appended claims.

What is claimed:

1. A method for increasing the efficiency of virtual machine processing, comprising:

providing on a first host system a parent virtual machine configured to host a guest operating system, the parent virtual machine comprising a software environment that appears as a hardware computer to the guest operating system;

copying the parent virtual machine to create a child virtual machine at a new location, wherein the copied child virtual machine comprises a version of the parent virtual machine without a memory of the parent virtual machine;

executing the child virtual machine as a first virtual machine; and copying a portion of the parent virtual machine to the child virtual machine as required for execution on a set of virtual machines, wherein the set of virtual machines comprises the parent virtual machine and the child virtual machine.

2. The method of claim 1, wherein the new location is on the first host computer system.

3. The method of claim 1, wherein the new location is on a second host computer system.

4. The method of claim 1, wherein the parent virtual machine is a network server.

5. The method of claim 1, further comprising using demand paging to send a subportion of the stored data to the at least one child virtual machine.

6. The method of claim 5, wherein using demand paging comprises: if the child virtual machine is accessing a first subportion of a first portion, temporarily suspending the child virtual machine and sending the first subportion to the child virtual machine.

7. The method of claim 5, wherein using demand paging further comprises: if not all of the first portion of the stored data associated with the parent virtual machine has been sent to the child virtual machine, sending a second subportion of the first portion to the child virtual machine.

8. The method of claim 5, wherein using demand paging comprises: if the child virtual machine is not accessing the memory of the parent virtual machine, sending memory pages of the first portion to the child virtual machine.

9. The method of claim 1, wherein the first portion is the stored data associated with the parent virtual machine.

10. The method of claim 5, wherein using demand paging comprises: if the parent virtual machine attempts to modify a first subportion, sending the first subportion to the child virtual machine before the first subportion is modified by the parent virtual machine.

11. The method of claim 10, wherein using demand paging further comprises: if not all of the first portion of the stored data associated with the parent virtual machine has been sent to the child virtual machine, sending a second subportion of the first portion to the child virtual machine.

12. The method of claim 5, wherein using demand paging comprises: if the parent virtual machine attempts to modify a first subportion, making a copy of the first subportion before the first subportion is modified by the parent virtual machine.

13. The method of claim 12, wherein the copy of the first subportion is a temporary copy.

14. The method of claim 12, wherein using demand paging further comprises: if not all of the first portion of the stored data associated with the parent virtual machine has been sent to the child virtual machine, sending a second subportion of the first portion to the child virtual machine.

15. A host computing system for increasing the efficiency of virtual machine processing, the host computing system comprising a hardware processor and an operating system running on the hardware processor, the host computing system storing thereon computer executable instructions that, if executed, cause the host computing system to:
    effectuate on the host computing system a parent virtual machine configured to host a guest operating system, the parent virtual machine comprising a software environment that appears as a hardware computer to the guest operating system;
    copy the parent virtual machine to create a child virtual machine at a new location, wherein the copied child virtual machine comprises a version of the parent virtual machine without a memory of the parent virtual machine;
    cause the execution of the child virtual machine as a first virtual machine; and
    copy a portion of the parent virtual machine to the child virtual machine as required for execution on a set of virtual machines, wherein the set of virtual machines comprises the parent virtual machine and the child virtual machine.

* * * * *